(12) United States Patent  
Yagi

(10) Patent No.: US 10,207,599 B2  
(45) Date of Patent: Feb. 19, 2019

(54) VEHICLE SEAT

(71) Applicant: TOYOTA JIDOSHA KABUSHIKI KAISHA, Toyota-shi, Aichi-ken (JP)

(72) Inventor: Yuji Yagi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/678,650

(22) Filed: Aug. 16, 2017

(65) Prior Publication Data

US 2018/0099583 A1 Apr. 12, 2018

(30) Foreign Application Priority Data

Oct. 6, 2016 (JP) .................. 2016-198239

(51) Int. Cl.
 *B60N 2/02* (2006.01)
 *B60N 2/16* (2006.01)
 *B60N 2/22* (2006.01)
 *B60N 2/68* (2006.01)

(52) U.S. Cl.
 CPC ........... *B60N 2/0232* (2013.01); *B60N 2/165* (2013.01); *B60N 2/1615* (2013.01); *B60N 2/1635* (2013.01); *B60N 2/2213* (2013.01); *B60N 2/68* (2013.01); *B60N 2002/024* (2013.01); *B60N 2002/0236* (2013.01)

(58) Field of Classification Search
 CPC .. B60N 2/0232; B60N 2/1615; B60N 2/1635; B60N 2/2213; B60N 2/68; B60N 2/0224; B60N 2/0236; B60N 2002/024

USPC .................................................... 297/344.12
See application file for complete search history.

(56) References Cited

U.S. PATENT DOCUMENTS

| 5,061,010 A | * | 10/1991 | LaPointe | A61G 5/14 297/325 |
| 5,121,895 A | * | 6/1992 | Ikegaya | B60N 2/0232 248/420 |
| 5,924,668 A | * | 7/1999 | Garrido | B60N 2/161 248/419 |
| 6,217,115 B1 | * | 4/2001 | Downey | B60N 2/08 248/421 |
| 6,843,460 B2 | * | 1/2005 | Koga | B60N 2/067 248/421 |
| 8,128,147 B1 | * | 3/2012 | Kanda | B60N 2/0232 296/65.05 |
| 2009/0230752 A1 | * | 9/2009 | Adragna | B60N 2/1615 297/463.1 |

(Continued)

FOREIGN PATENT DOCUMENTS

JP 2002-160559 A 6/2002
JP 2011-213222 A 10/2011

(Continued)

*Primary Examiner* — Mark R Wendell
(74) *Attorney, Agent, or Firm* — Oliff PLC

(57) ABSTRACT

A vehicle seat includes a seat cushion frame provided at a seat cushion; a seatback frame structuring a seatback, the seatback frame being rotatably coupled to a front-rear direction rear end portion of the seat cushion frame via a rotation axle; a drive unit disposed at a front-rear direction front side of the seat cushion frame; and a first driving force transmission unit that couples the drive unit with the rotation axle and transmits driving force of the drive unit to the rotation axle.

4 Claims, 11 Drawing Sheets

(56) References Cited

U.S. PATENT DOCUMENTS

| | | | |
|---|---|---|---|
| 2010/0013285 A1* | 1/2010 | Stanz | B60N 2/0232 297/344.13 |
| 2011/0043017 A1* | 2/2011 | Kokubo | B60N 2/0232 297/337 |
| 2011/0043024 A1* | 2/2011 | Kokubo | B60N 2/0232 297/378.1 |
| 2012/0261963 A1* | 10/2012 | Heyer | B60N 2/0232 297/313 |
| 2014/0008510 A1* | 1/2014 | Ozawa | B60N 2/067 248/542 |
| 2014/0070585 A1* | 3/2014 | LaPointe | A61G 5/14 297/316 |
| 2014/0238188 A1 | 8/2014 | Ito | |
| 2014/0284979 A1 | 9/2014 | Nihonmatsu et al. | |
| 2015/0091358 A1* | 4/2015 | Hattori | B60N 2/06 297/452.2 |

FOREIGN PATENT DOCUMENTS

| | | | |
|---|---|---|---|
| JP | 2013-107624 A | 6/2013 | |
| JP | 2014-184819 A | 10/2014 | |

\* cited by examiner

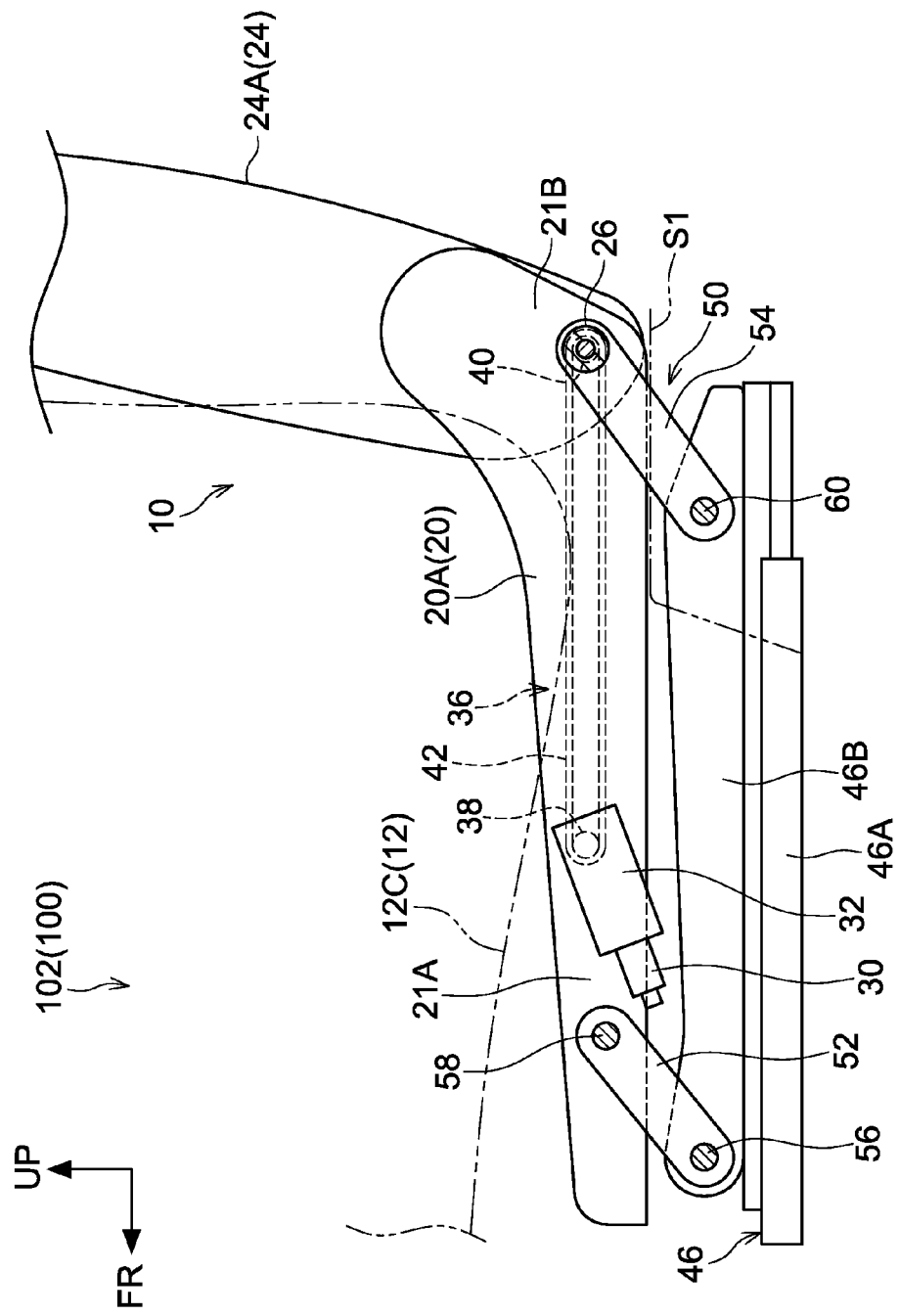

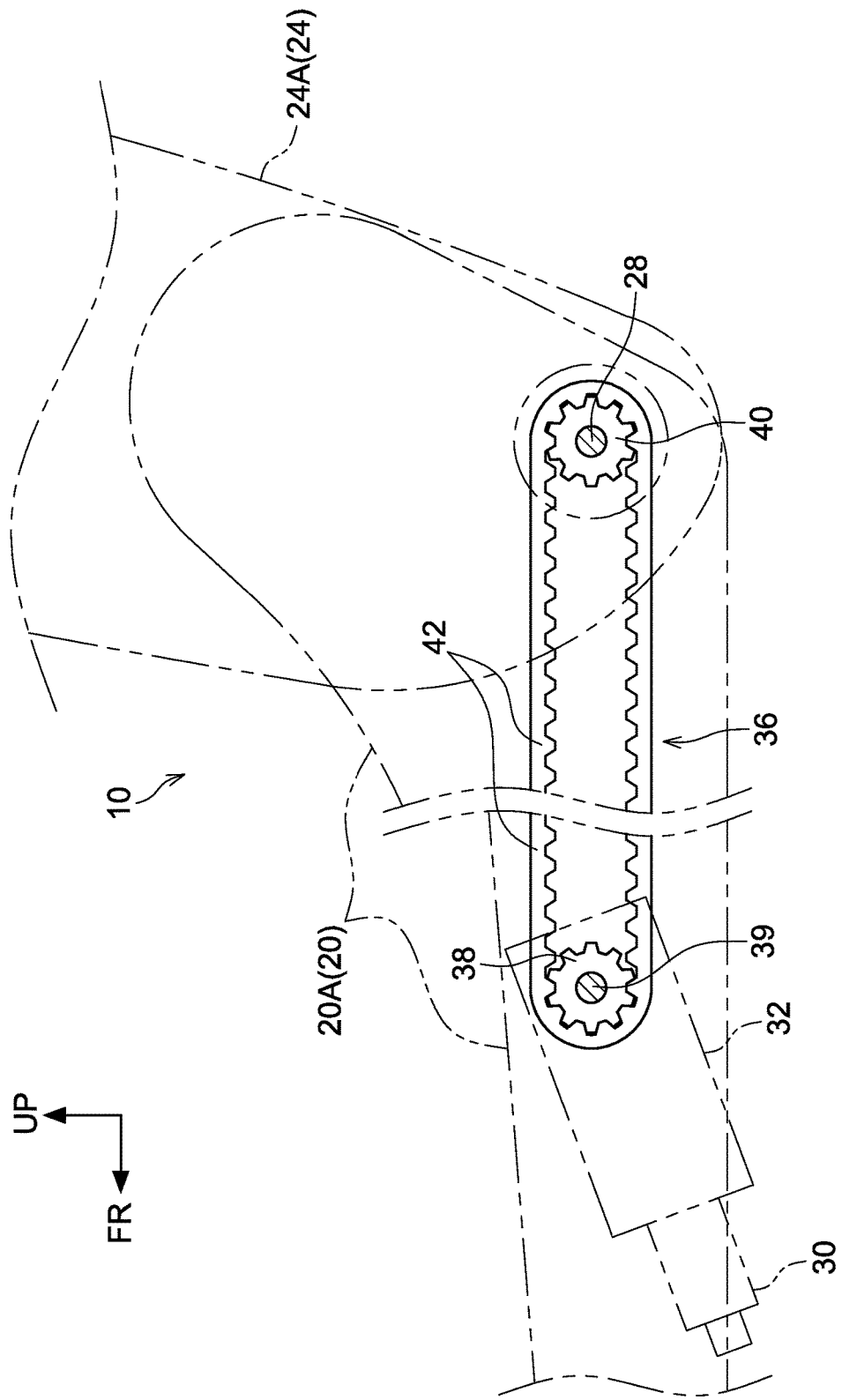

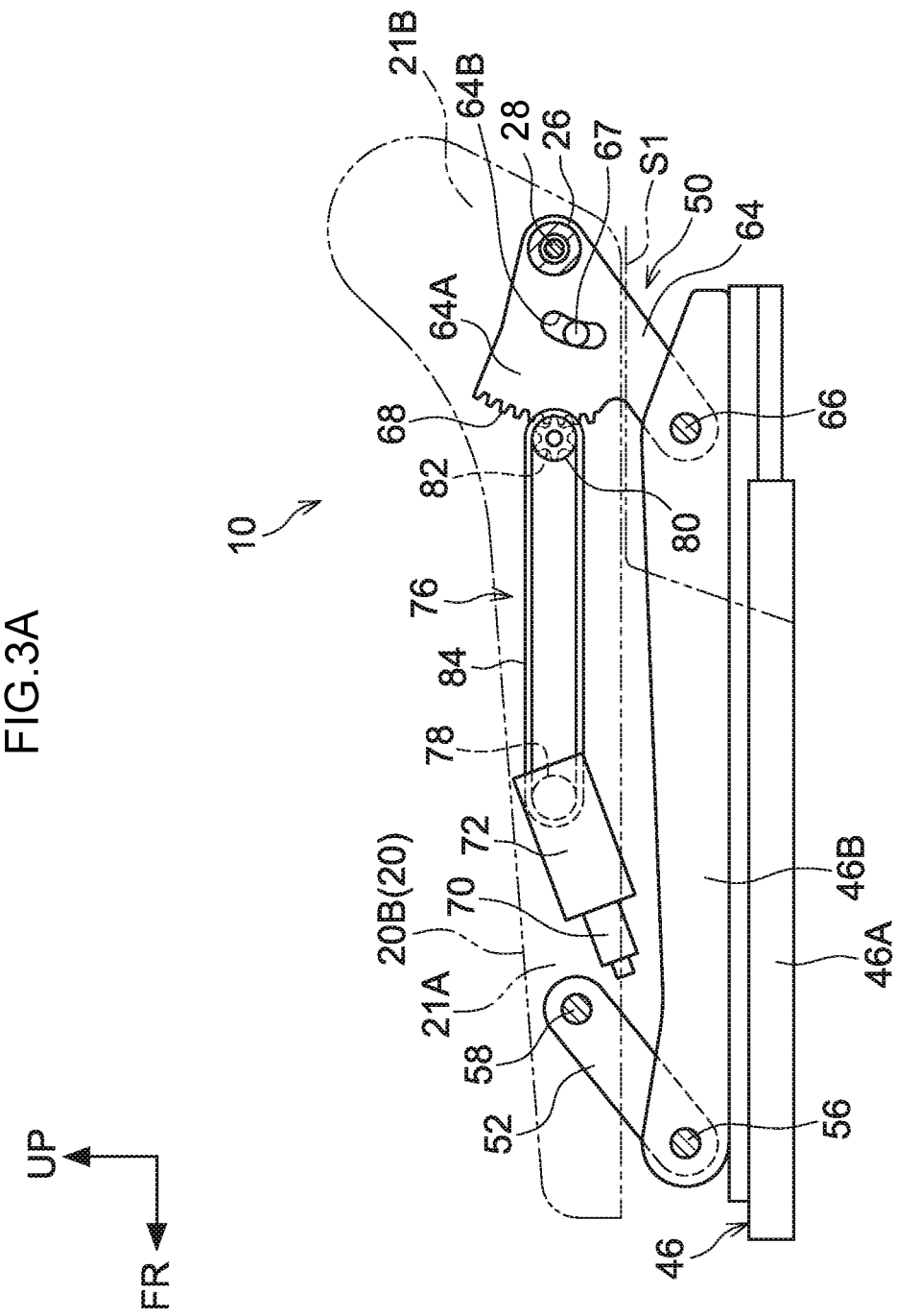

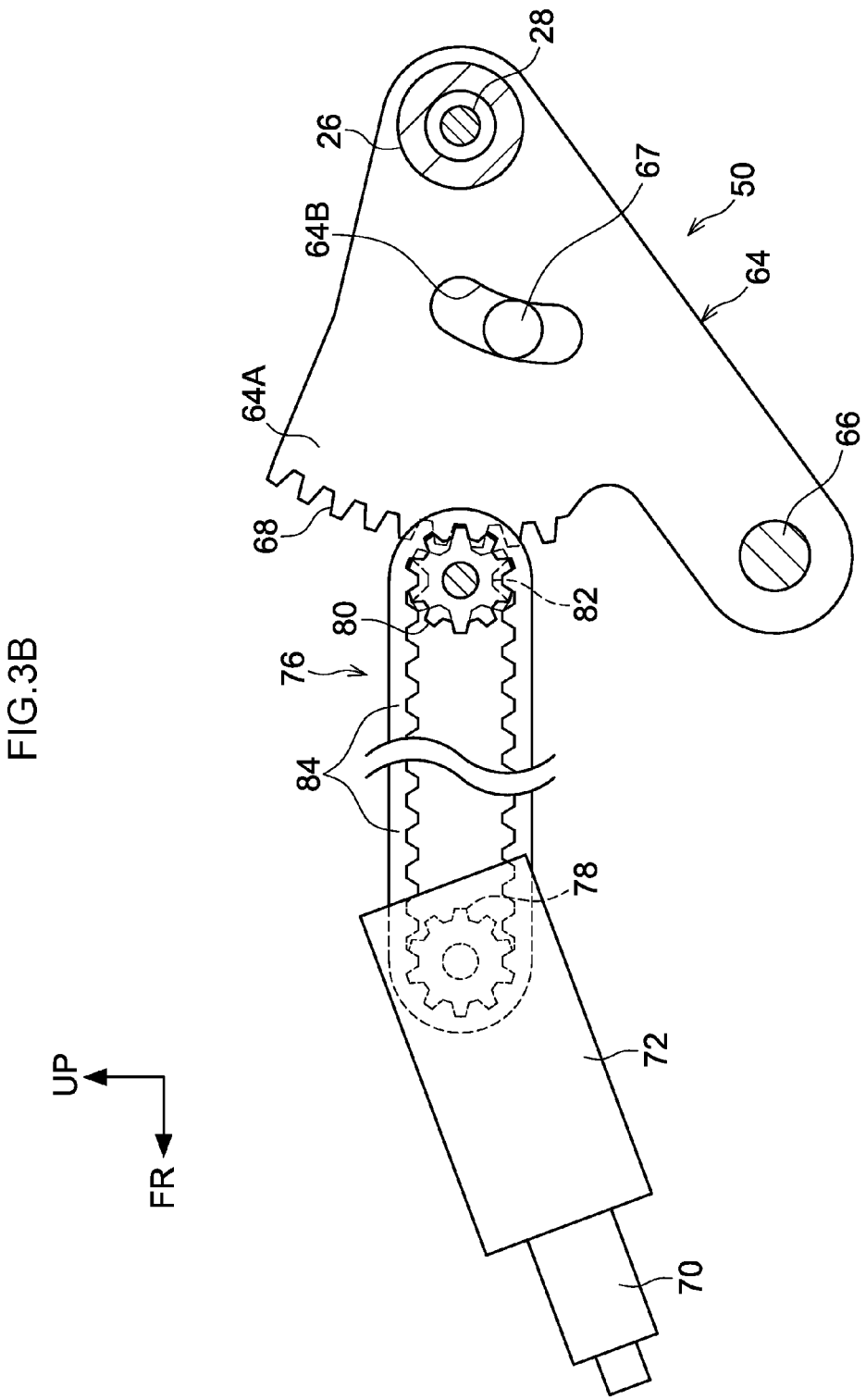

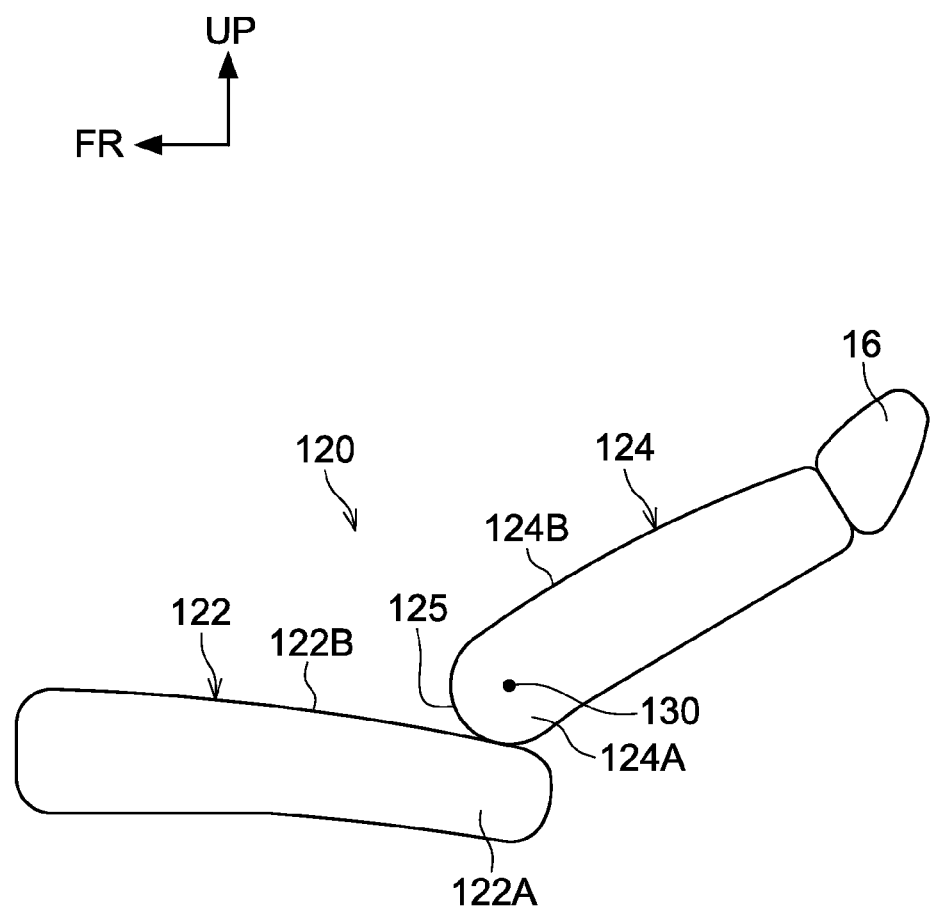

VEHICLE SEAT

CROSS-REFERENCE TO RELATED APPLICATION

This application claims priority under 35 USC 119 from Japanese Patent Application No. 2016-198239 filed Oct. 6, 2016, the disclosure of which is incorporated by reference herein in its entirety.

BACKGROUND

Technical Field

Preferred embodiments relate to a vehicle seat.

Background Art

Japanese Patent Application Laid-Open (JP-A) No. 2014-184819 discloses a structure of a vehicle seat equipped with a reclining mechanism that adjusts a reclining angle of a seatback with respect to a seat cushion, in which structure a motor serves as a drive source. In this structure, the motor is disposed at a seat width direction inner side of a coupling portion between the seat cushion and the seatback. Meanwhile, JP-A No. 2002-160559 recites a vehicle seat equipped with a reclining motor and with a lifter motor that moves a seat cushion upward and downward.

SUMMARY

In recent years, there have been demands for a rotation center of reclining of a vehicle seat, around which a seatback rotates with respect to a seat cushion, to be lowered in order to improve comfort of the vehicle seat during reclining. For example, if the rotation center of reclining is lowered, the posture of a vehicle occupant does not slump significantly during reclining. Thus, comfort is improved. However, if the rotation center of reclining is lowered in the structure recited in JP-A No. 2014-184819, the position of the motor is also lowered. As a result, space underneath the rear side of the vehicle seat may be closed off and space available for the legs of a rear seat occupant may be reduced.

In consideration of the above circumstances, an object of preferred embodiments is to provide a vehicle seat that may assure space available for the legs of a rear seat occupant even if a rotation center of reclining is lowered.

A vehicle seat of a first aspect of the disclosure includes: a seat cushion frame provided at a seat cushion; a seatback frame structuring a seatback, the seatback frame being rotatably coupled to a front-rear direction rear end portion of the seat cushion frame via a rotation axle; a drive unit disposed at a front-rear direction front side of the seat cushion frame; and a first driving force transmission unit that couples the drive unit with the rotation axle and that transmits driving force of the drive unit to the rotation axle.

According to the first aspect, the seatback is rotatably coupled via the rotation axle to the front-rear direction rear end portion of the seat cushion frame. The drive unit is disposed at the front-rear direction front side of the seat cushion frame. Driving force from the drive unit is transmitted to the rotation axle by the first driving force transmission unit that couples the drive unit with the rotation axle. Accordingly, the seatback rotates in the front-rear direction with respect to the seat cushion frame. In the structure described above, the drive unit is disposed at the front side of the seat cushion frame. Therefore, even if a position of the rotation axle, which is to say a rotation center of reclining, is lowered in the seat up-down direction, space available for the legs of a rear seat occupant underneath the rear side of the vehicle seat may be assured.

In a vehicle seat of a second aspect of the disclosure, in the first aspect: the seat cushion frame includes a pair of side frames that oppose one another, one of the pair being disposed at one side of the seat cushion frame in a seat width direction, the other of the pair being disposed at the other side of the seat cushion frame in the seat width direction; and the drive unit is mounted to a face of a seat width direction inner side of one side frame of the pair of side frames.

According to the second aspect, the seat cushion frame includes the pair of side frames that oppose one another, one of the pair being disposed at one side of the seat cushion frame in a seat width direction, the other of the pair being disposed at the other side of the seat cushion frame in the seat width direction, and the drive unit is mounted to t a face of a seat width direction inner side of the one side frame. As a result, a width of the seat cushion may be made narrower than in a structure in which a drive unit is mounted to a face of a seat width direction outer side of a side frame.

A vehicle seat of a third aspect of the disclosure, in the second aspect, further includes: a lifting and lowering apparatus configured to move the seat cushion frame upward and downward in an up-down direction with respect to a base provided at a floor surface; and a lifter drive unit that drives the lifting and lowering apparatus. The lifter drive unit is mounted at a face of a seat width direction inner side of the other side frame of the pair of side frames.

According to the third aspect, the lifter drive unit that drives the lifting and lowering apparatus is mounted at the face of the seat width direction inner side of the other side frame. As a result, the width of the seat cushion of the vehicle seat may be made narrower than in a structure in which a lifter drive unit is mounted to a face of a seat width direction outer side of the other side frame.

In a vehicle seat of a fourth aspect of the disclosure, in the third aspect, the lifter drive unit is disposed at a front-rear direction front side of the other side frame; and the vehicle seat further includes a second driving force transmission unit that couples an operating unit with the lifter drive unit and transmits driving force of the lifter drive unit to the operating unit, the operating unit being disposed at a front-rear direction rear end portion of the other side frame and operating the lifting and lowering apparatus According to the fourth aspect, the lifter drive unit is disposed at the front side of the other side frame. Driving force from the lifter drive unit is transmitted to the operating unit disposed at the rear end portion of the other side frame by the second driving force transmission unit that couples the lifter drive unit with the operating unit. Accordingly, the lifting and lowering apparatus is operated. Therefore, in the vehicle seat, space available for the legs of a rear seat occupant underneath the rear side of the vehicle seat may be assured more than in a structure in which a lifter drive unit is mounted at a face of the seat width direction inner side of a rear end portion of the other side frame.

In a vehicle seat of a fifth aspect of the disclosure, in the first aspect, a lower end portion of the seatback is disposed at a rear side of a front-rear direction rear end portion of the seat cushion; and at least a portion of the lower end portion of the seatback is disposed at a lower side with respect to a sitting face of the seat cushion.

According to the fifth aspect, the position of the rotation axle of the seatback may be lowered further in the vehicle up-down direction than in a structure in which a lower end portion of a seatback is disposed at an upper side of a rear end portion of a seat cushion. As a result, hollowing of a connecting portion between a sitting face of the seat cushion and a front face of the seatback during reclining of the seatback may be reduced. Consequently, a back surface position of a vehicle occupant when the vehicle occupant is sitting on the vehicle seat may curve smoothly along the sitting face of the seat cushion and the front face of the seatback, and slumping of the posture of the vehicle occupant during reclining may be suppressed.

According to the vehicle seat of the present disclosure, space available for the legs of a rear seat occupant may be assured even if the rotation center of reclining is lowered.

BRIEF DESCRIPTION OF DRAWINGS

FIG. 2A is a side view showing a reclining motor or the like and a first driving force transmission unit, which are mounted at one side frame used in the vehicle seat according to the exemplary embodiment;

FIG. 2B is a side view showing, in a magnified state, the reclining motor or the like and the first driving force transmission unit that are shown in FIG. 2A;

FIG. 3A is a side view showing a lifter motor or the like and a second driving force transmission unit, which are mounted at another side frame used in the vehicle seat according to the exemplary embodiment;

FIG. 3B is a side view showing, in a magnified state, the lifter motor or the like and the second driving force transmission unit that are shown in FIG. 3A;

FIG. 9 is a side view showing a state of the vehicle seat according to the comparative example in which a seatback has been rotated about a rotation axle and reclined.

DESCRIPTION OF EMBODIMENTS

Figure 1:
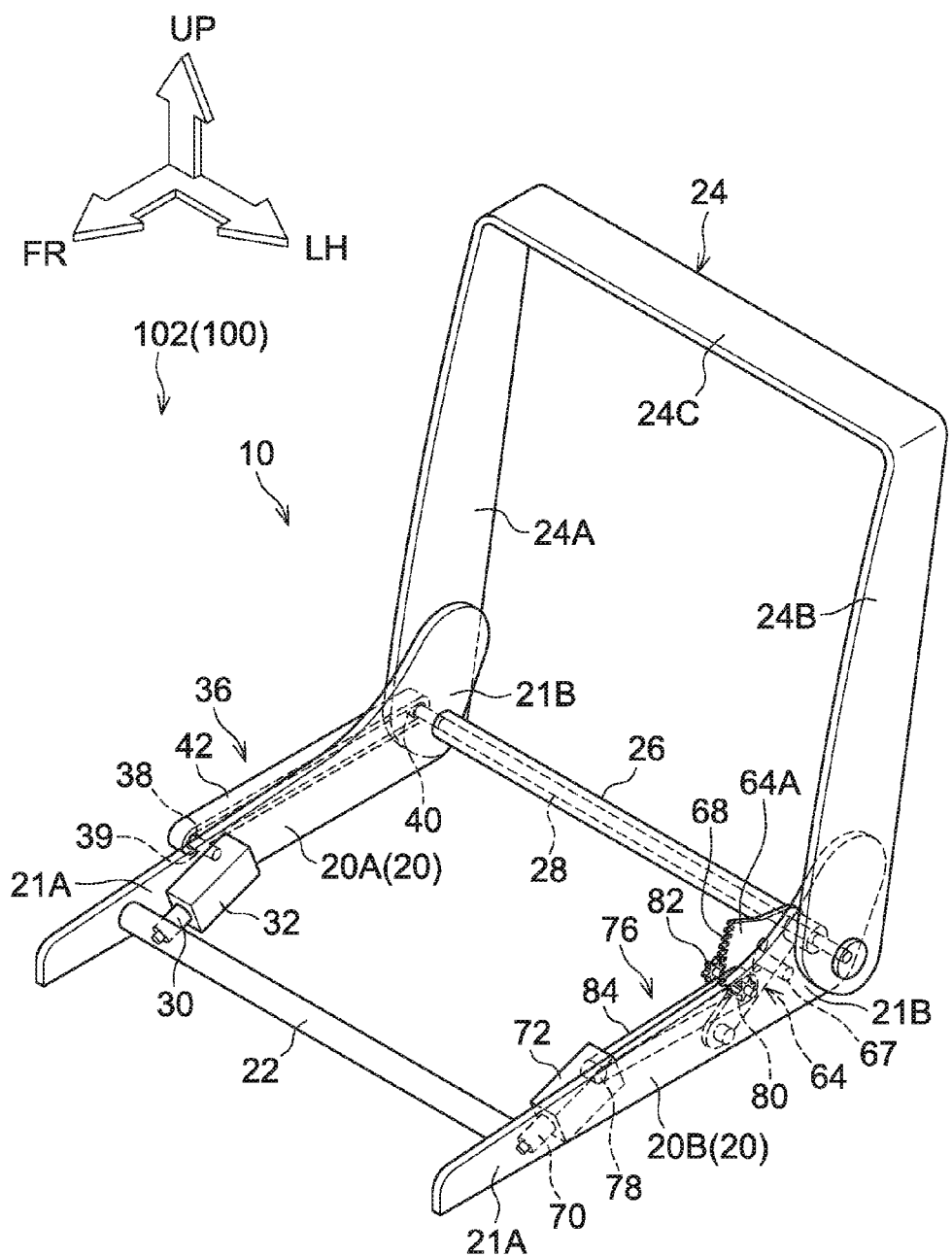
FIG. 1 is a perspective view showing structures in the vicinity of a seat cushion frame and seatback frame that are used in a vehicle seat according to an exemplary embodiment.

An exemplary embodiment of the present invention is described in detail in accordance with the drawings. Each arrow that is shown where appropriate in the drawings indicates such that an arrow FR indicates the front side of a vehicle seat, an arrow UP indicates the upper side of the vehicle seat, and an arrow LH indicates the left side of the vehicle seat when looking toward the front. In the following descriptions, where the terms front, rear, up, down, left and right are used without being particularly specified, the same refer to front, rear, up-down of the vehicle seat, and left and right (in a width direction of the vehicle seat) when looking toward the front.

A vehicle seat 10 according to the exemplary embodiment of the present disclosure is described below using FIG. 1 to FIG. 6.

Figure 5:
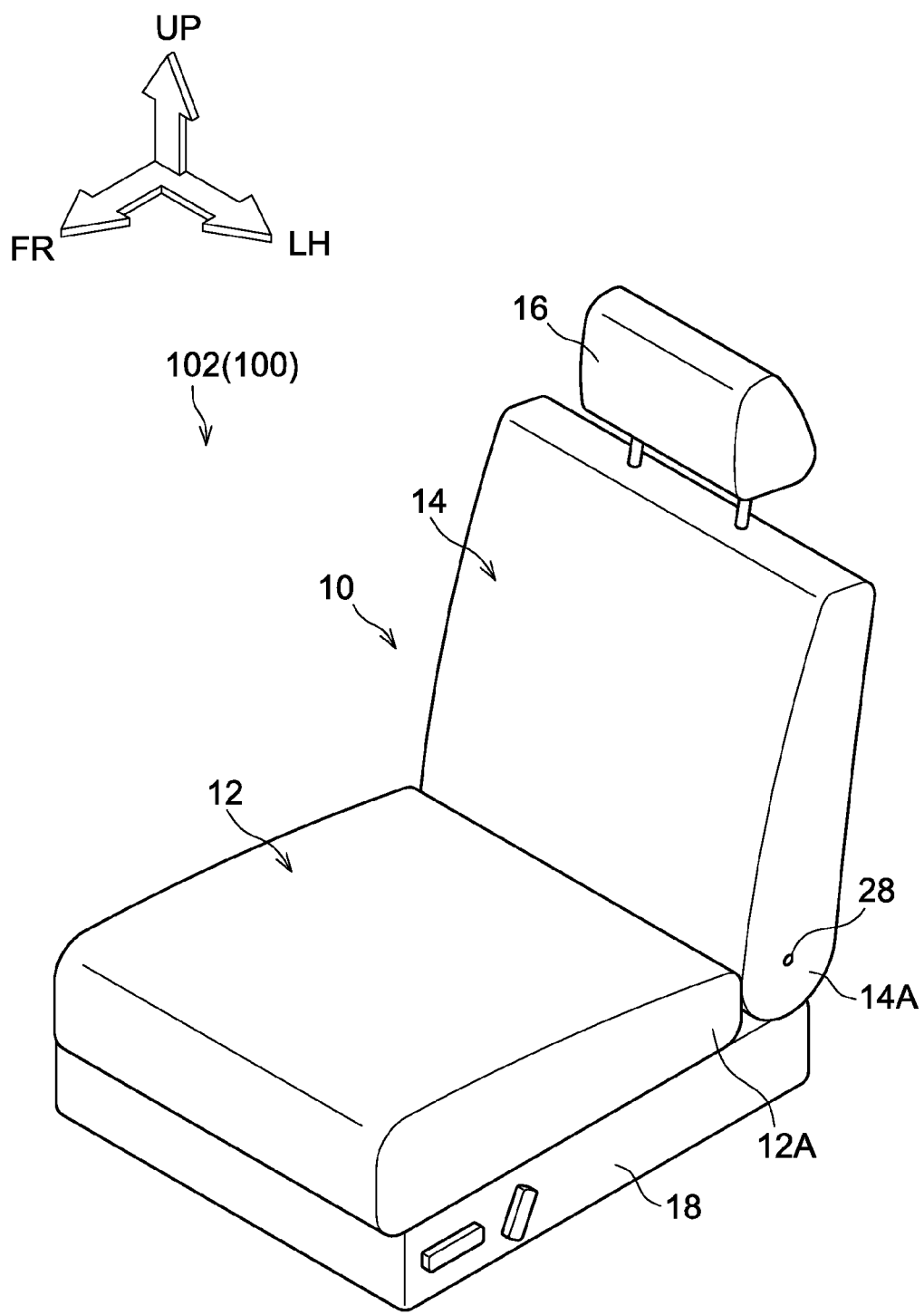
FIG. 5 is a perspective view showing the vehicle seat according to the exemplary embodiment.

FIG. 5 shows the vehicle seat 10 in a perspective view. As shown in FIG. 5, the vehicle seat 10 is provided with a seat cushion 12 and a seatback 14. The seat cushion 12 supports the pelvis area and thigh area of a seated vehicle occupant (see the vehicle occupant P illustrated in FIG. 8). The seatback 14 is provided so as to extend upward from the rear side of a rear end portion 12A of the seat cushion 12, and supports the waist area and back area of the vehicle occupant. A headrest 16 that supports the head area of the vehicle occupant is provided at an upper end portion of the seatback 14.

In the vehicle seat 10, a lower end portion 14A of the seatback 14 is disposed at the rear side of the rear end portion 12A of the seat cushion 12. The vehicle seat 10 is provided with a pedestal 18 at the up-down direction lower side of the seat cushion 12 and the seatback 14. The pedestal 18 supports the seat cushion 12 and the seatback 14. The vehicle seat 10 is disposed in a passenger compartment 102 of a vehicle 100 so as to face to the front side in the vehicle front-rear direction. In this first exemplary embodiment, the vehicle seat 10 is disposed at the vehicle width direction left side when looking toward the vehicle front.

As shown in FIG. 1, the vehicle seat 10 is provided with a seat cushion frame (below referred to as "the cushion frame") 20 that is disposed inside the seat cushion 12 (see FIG. 5). The cushion frame 20 is provided with a pair of left and right side frames 20A and 20B that are disposed at both sides of the cushion frame 20 in the seat width direction and oppose one another. The left and right pair of side frames 20A and 20B are formed by long, narrow, plate-shaped members that extend in the vehicle front-rear direction. A front rod 22 spans between front end portions 21A and 21A of the side frames 20A and 20B along the seat width direction.

The vehicle seat 10 is provided with a seatback frame (below referred to as "the back frame") 24 that is disposed inside the seatback 14 (see FIG. 5). The back frame 24 is formed substantially in an inverted "U" shape in front view. The back frame 24 is shaped by a long, narrow, plate-shaped member being inflected at two locations at both sides thereof in the seat width direction. In more specific terms, the back frame 24 is provided with a pair of left and right side frames 24A and 24B and an upper frame 24C. The side frames 24A and 24B are disposed at both sides of the back frame 24 in the seat width direction and oppose one another. The upper frame 24C joins between upper end portions of the pair of left and right side frames 24A and 24B. Lower end portions of the pair of left and right side frames 24A and 24B are disposed at seat width direction outer sides of the pair of left and right side frames 20A and 20B of the cushion frame 20.

A rear rod 26 (see FIG. 4) that is arranged along the seat width direction between the side frames 20A and 20B is provided at front-rear direction rear end portions 21B and 21B of the side frames 20A and 20B. The rear rod 26 is not fastened to the side frames 20A and 20B but supported to be turnable with respect to the side frames 20A and 20B.

A rotation axle 28 is inserted inside the rear rod 26. The rotation axle 28 is structured to turn forward and rearward, and is an example of a rotation axle. The rotation axle 28 extends to the seat width direction outer sides beyond the side frames 20A and 20B of the cushion frame 20. End portions at both sides in the width direction of the rotation axle 28 are fastened by welding or the like to the side frames 24A and 24B of the back frame 24 (see FIG. 4). The rotation axle 28 is configured to be turnable independently of the rear rod 26. The rotation axle 28 is disposed at the rear end portions 21B and 21B of the side frames 20A and 20B of the cushion frame 20, at lower end portions of the side frames 24A and 24B of the back frame 24. The back frame 24 is rotated (that is, swings) in the vehicle front-rear direction with respect to the cushion frame 20 by rotation of the rotation axle 28. Thus, the seatback 14 is configured to be reclined in the vehicle front-rear direction with respect to the seat cushion 12 (see FIG. 6).

Figure 6:
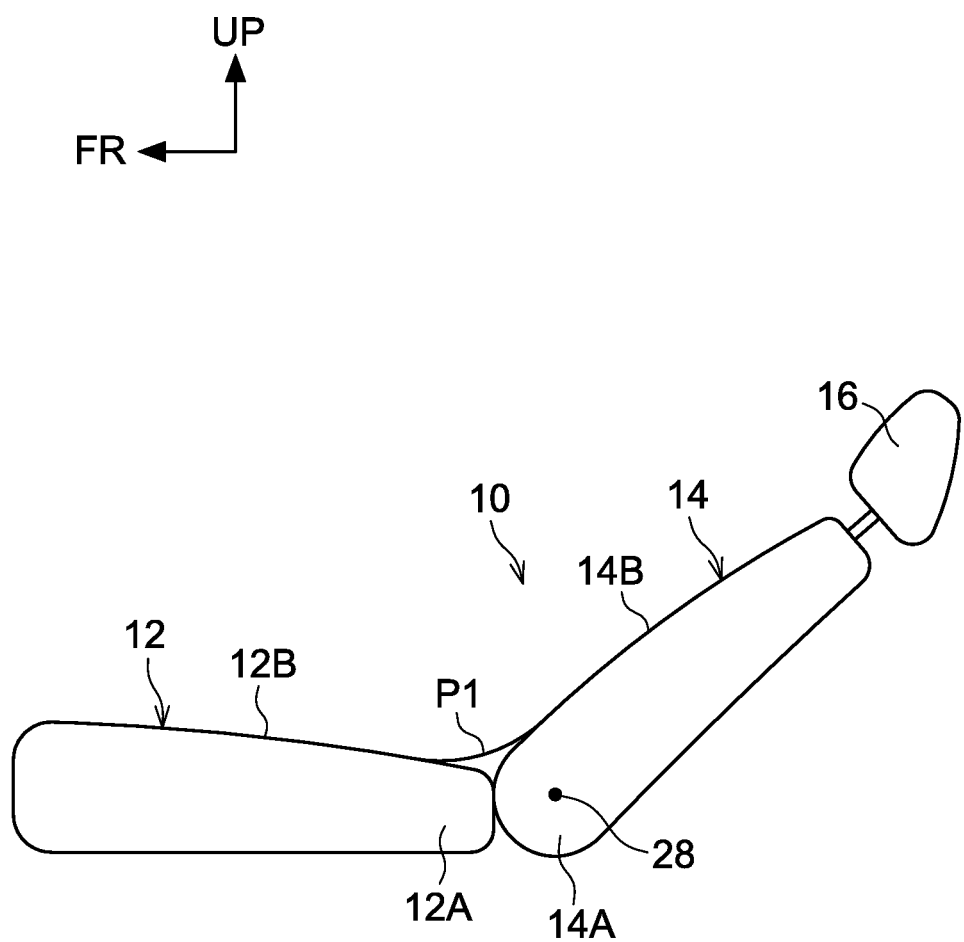
FIG. 6 is a side view showing a state of the vehicle seat according to the exemplary embodiment in which a seatback has been rotated about a rotation axle and reclined.

As shown in FIG. 5 and FIG. 6, the lower end portion 14A of the seatback 14 is disposed at the rear side of the rear end portion 12A of the seat cushion 12. Therefore, in the vehicle seat 10, the position of the rotation axle 28 may be lowered in the vehicle up-down direction compared to a structure in which a lower end portion of a seatback is disposed at an upper side of a rear end portion of a seat cushion.

As shown in FIG. 1, FIG. 2A, FIG. 2B and FIG. 4, a motor 30 for reclining is provided at one of the front end portions 21A of the cushion frame 20. A gearbox 32 inside which plural gears are arranged is coupled to the motor 30. The motor 30 and gearbox 32 are an example of a drive unit. The motor 30 and gearbox 32 are disposed at the front side of the cushion frame 20 (that is, at the side of the cushion frame 20 at which the front end portion 21A is disposed). An area in which the motor 30 and gearbox 32 are disposed is designated at a location from a front-rear direction middle portion toward the front side of the cushion frame 20 so that putting of the legs of a rear seat occupant is not obstructed. The motor 30 and gearbox 32 are mounted to a face of the seat width direction inner side of the side frame 20A, which is one of the pair of side frames 20A and 20B (in the present exemplary embodiment, the side frame that is at the vehicle width direction right side looking from the vehicle rear side). Although not shown in the drawings, the motor 30 and gearbox 32 are fixed to the face of the seat width direction inner side of the one side frame 20A by mounting members.

Figure 4:
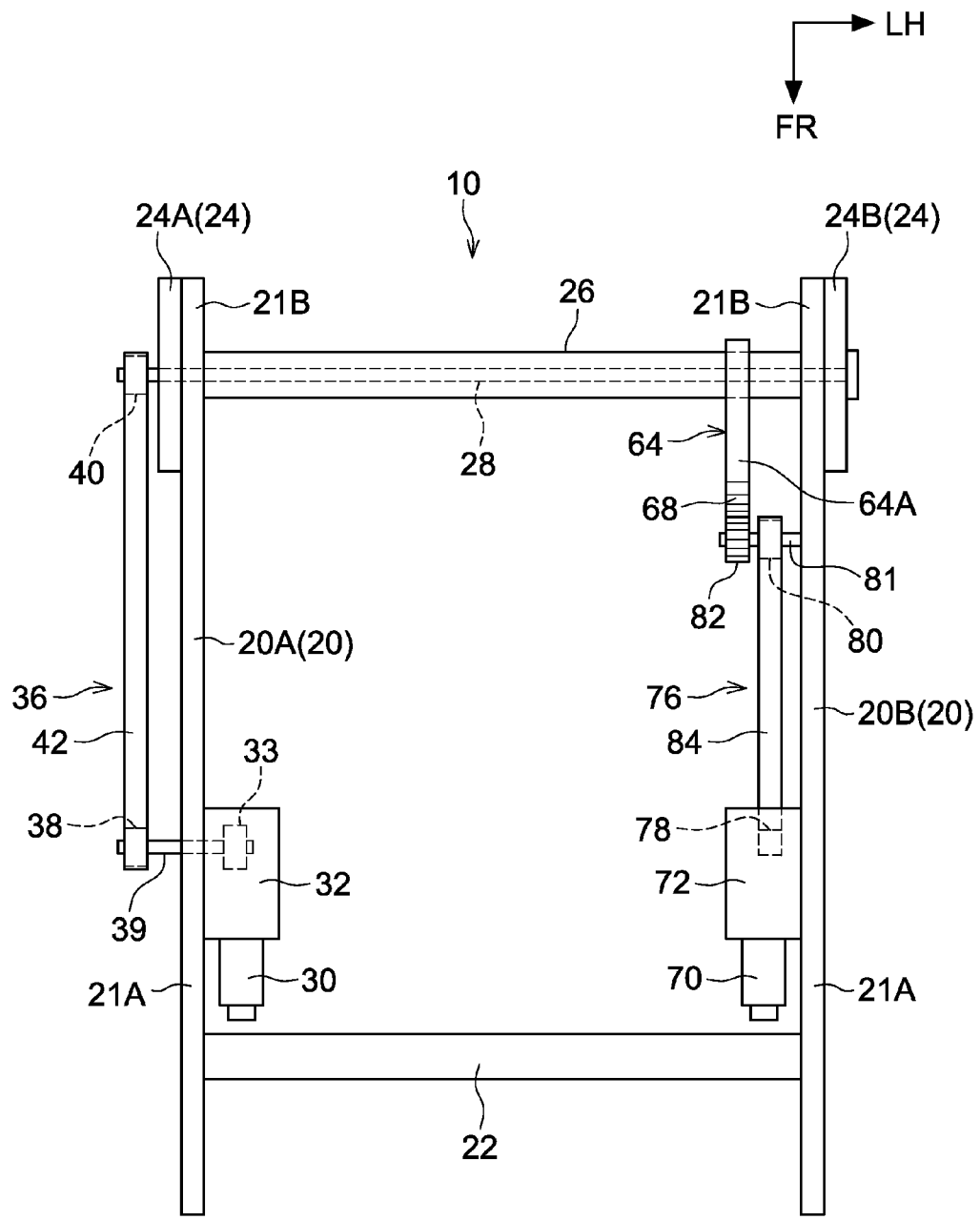
FIG. 4 is a plan view showing the structures in the vicinity of the seat cushion frame and seatback frame that are used in the vehicle seat according to the exemplary embodiment.

The vehicle seat 10 is provided with a first driving force transmission unit 36 at the side of the cushion frame 20 at which the one side frame 20A is disposed. The first driving force transmission unit 36 couples the motor 30 and gearbox 32 with the rotation axle 28 and transmits driving force of the motor 30. As shown in FIG. 4, the first driving force transmission unit 36 is provided with a gear 38 that protrudes from the gearbox 32 and is disposed at the seat width direction outer side of the side frame 20A (see FIG. 1 and FIG. 2A). The first driving force transmission unit 36 is further provided with a pinion gear 40 and an endless-type belt 42 (see FIG. 1). The pinion gear 40 is coupled to an end portion of the rotation axle 28 at the seat width direction outer side of the side frame 24A of the back frame 24. The belt 42 is wound round the gear 38 and the pinion gear 40. The gear 38, the pinion gear 40 and the belt 42 are disposed at the seat width direction outer side of the side frame 24A (see FIG. 1). The belt 42 is equipped with plural teeth at the inner periphery side thereof. The plural teeth of the belt 42 mesh with the gear 38 and with the pinion gear 40 (see FIG. 2B).

As shown in FIG. 4, the gearbox 32 is provided with an output gear 33 that is disposed furthest downstream of the plural gears (not shown in the drawings). A shaft portion 39 of the gear 38 penetrates through a hole in the side frame 20A and connects to a shaft portion of the output gear 33 of the gearbox 32. Thus, in the first driving force transmission unit 36, rotation of the motor 30 causes the gear 38 to rotate via the plural gears of the gearbox 32 and the output gear 33, causing the belt 42 to move in a circumferential direction thereof. The movement of the belt 42 causes the pinion gear 40 to rotate and the rotation axle 28 rotates integrally with the pinion gear 40. Accordingly, driving force from the motor 30 is transmitted to the rotation axle 28 and the back frame 24 is rotated in the vehicle front-rear direction.

As shown in FIG. 2A, an under-buttock region 12C is formed at the seat cushion 12. When a vehicle occupant (not shown in the drawings) is seated, the buttock area (pelvis area) of the vehicle occupant is disposed on the under-buttock region 12C. In a side view of the vehicle seat 10, a front portion of the under-buttock region 12C is disposed at an upper side of the cushion frame 20. A rear portion of the under-buttock region 12C is disposed at positions that overlap with an upper portion of the cushion frame 20 in the side view of the vehicle seat 10.

As shown in FIG. 2A and FIG. 3A, the vehicle seat 10 is equipped with a lifting and lowering apparatus 50 that is configured to move the cushion frame 20 upward and downward in the up-down direction with respect to bases 46 provided on a floor surface of the passenger compartment 102. The bases 46 are provided with sliding rails 46A and mounting frames 46B. The sliding rails 46A are fixed to the floor surface of the passenger compartment 102 substantially along the vehicle front-rear direction. The mounting frames 46B move in the vehicle front-rear direction along the sliding rails 46A. The bases 46 are provided as a pair at both sides of the vehicle seat 10 in the width direction. The sliding rails 46A are fixed to the floor surface of the passenger compartment 102 by brackets, which are not shown in the drawings.

As shown in FIG. 2A, the lifting and lowering apparatus 50 is equipped with lifter links 52 and 54 that are coupled to the front-rear in the vehicle front-rear direction of the mounting frame 46B that is at the seat width direction right side. The lifter link 52 at the vehicle front side is rotatably mounted to a front portion of the mounting frame 46B by a link axle 56. An upper end portion of the lifter link 52 is rotatably mounted to a front portion of the side frame 20A of the cushion frame 20 by a link axle 58. A lower end portion of the lifter link 54 at the vehicle rear side is rotatably mounted to a rear portion of the mounting frame 46B by a link axle 60. An upper end portion of the lifter link 54 is rotatably mounted to the rear rod 26 at the rear portion of the side frame 20A. A structure in which the upper end portion of the lifter link 54 is connected to the rear rod 26 at the rear portion of the side frame 20A is also possible.

As shown in FIG. 3A, the lifting and lowering apparatus 50 is also equipped with another of the lifter link 52 and a lifter link 64. This lifter link 52 is coupled to the vehicle front-rear direction front side of the mounting frame 46B that is at the seat width direction left side. The lifter link 64 is coupled to the vehicle front-rear direction rear side of the mounting frame 46B. The lifter link 52 at the vehicle front side is rotatably mounted to a front portion of the mounting frame 46B by the link axle 56. An upper end portion of the lifter link 52 is rotatably mounted to a front portion of the side frame 20B of the cushion frame 20 by the link axle 58.

A lower end portion of the lifter link 64 at the vehicle rear side is rotatably mounted to a rear portion of the mounting frame 46B by a link axle 66. An upper end portion of the lifter link 64 is fastened by welding or the like to the rear rod 26 (see FIG. 4). The lifter link 64 is provided with a fan-shaped portion 64A that is formed in a fan shape at a front portion of the upper side of the lifter link 64. A sector gear 68 is formed at a front portion of the fan-shaped portion 64A to serve as an operating unit. The lifter link 64 is provided with an aperture portion 64B at a middle portion of the lifter link 64 in the vehicle front-rear direction. The aperture portion 64B curves along the up-down direction. A circular rod-shaped protrusion portion 67 is inserted into the aperture portion 64B. The protrusion portion 67 is fixed to the side frame 20B (see FIG. 1). Accordingly, the aperture portion 64B of the lifter link 64 is guided by the protrusion portion 67 when the lifter link 64 is being rotated in the vehicle front-rear direction. Note that lower portions of the structural members of the lifting and lowering apparatus 50 are disposed inside the pedestal 18 (see FIG. 5).

As shown in FIG. 1, FIG. 3A, FIG. 3B and FIG. 4, a lifter motor 70 that drives the lifting and lowering apparatus 50 is provided at the front end portion 21A of the cushion frame 20. A gearbox 72 inside which plural gears are arranged is coupled to the lifter motor 70. The lifter motor 70 and gearbox 72 are an example of a lifter drive unit. The lifter motor 70 and gearbox 72 are disposed at the front side of the cushion frame 20 (that is, the side of the cushion frame 20 at which the front end portion 21A is disposed). An area in which the lifter motor 70 and gearbox 72 are disposed is designated at a range from a front-rear direction middle portion toward the front side of the cushion frame 20 so that putting of the legs of a rear seat occupant that is not obstructed. The lifter motor 70 and gearbox 72 are mounted to a face of the seat width direction inner side of the side frame 20B, which is the other of the pair of side frames 20A and 20B (in the present exemplary embodiment, the side frame that is at the vehicle width direction left side when looking from the vehicle rear side). Although not shown in the drawings, the lifter motor 70 and gearbox 72 are fixed to the face of the seat width direction inner side of the other side frame 20B by mounting members.

The vehicle seat 10 is provided with a second driving force transmission unit 76 at the side of the cushion frame 20 at which the other side frame 20B is disposed. The second driving force transmission unit 76 transmits driving force from the lifter motor 70 to the sector gear 68. In other words, the second driving force transmission unit 76 is a structure that couples the lifter motor 70 and gearbox 72 with the sector gear 68 and transmits driving force of the lifter motor 70. The gearbox 72 is provided with an output gear 78. The second driving force transmission unit 76 is provided with a pinion gear 80 and a gear 82 (see FIG. 4). The pinion gear 80 is rotatably supported at the seat width direction inner side of a front-rear direction rear portion of the side frame 20B. The gear 82 is provided coaxially with a shaft portion 81 of the pinion gear 80. The gear 82 is a structure that rotates integrally with the pinion gear 80 and meshes with the sector gear 68 (see FIG. 3B, FIG. 4 and the like). The second driving force transmission unit 76 is further provided with an endless-type belt 84 that is wound round the output gear 78 of the gearbox 72 and the pinion gear 80. The output gear 78, the pinion gear 80, the belt 84, the gear 82 and the lifter link 64 provided with the sector gear 68 are disposed at the seat width direction inner side of the side frame 24B. The belt 84 is equipped with plural teeth at the inner periphery side thereof. The plural teeth of the belt 84 mesh with the output gear 78 and with the pinion gear 80 (see FIG. 3B).

In the second driving force transmission unit 76, rotation of the lifter motor 70 causes the output gear 78 of the gearbox 72 to rotate, causing the belt 84 to move in a circumferential direction thereof. The movement of the belt 84 causes the pinion gear 80 to rotate, and the gear 82 rotates integrally with the pinion gear 80. The rotation of the gear 82 causes the sector gear 68 to rotate in the up-down direction, and the lifter link 64 rotates together with the sector gear 68. That is, the second driving force transmission unit 76 is a structure that couples the lifter motor 70 with the sector gear 68 disposed at the rear end portion 21B of the side frame 20B and transmits the driving force of the lifter motor 70. Accordingly, when the lifting and lowering apparatus 50 is driven, the cushion frame 20 moves upward and downward in the up-down direction with respect to the mounting frames 46B.

Now, operation and effects of the vehicle seat 10 according to the first exemplary embodiment are described.

As shown in FIG. 1 and the like, the back frame 24 of the vehicle seat 10 is rotatably coupled to the rear end portions 21B of the cushion frame 20 via the rotation axle 28. The motor 30 and the gearbox 32 are disposed at the front end portion 21A of the side frame 20A of the cushion frame 20. Driving force from the motor 30 is transmitted to the rotation axle 28 by the first driving force transmission unit 36 that couples the motor 30 and gearbox 32 with the rotation axle 28.

More specifically, the first driving force transmission unit 36 is provided with the gear 38 that projects from the gearbox 32, the pinion gear 40 that is coupled to the rotation axle 28 at the rear end portion 21B of the side frame 24A, and the belt 42 that is wound around the gear 38 and the pinion gear 40. When the motor 30 is driven, the gear 38 is rotated, via the gearbox 32, and the belt 42 moves in a circumferential direction thereof. When the belt 42 moves, the pinion gear 40 is rotated and the rotation axle 28 rotates integrally with the pinion gear 40. As a result, the back frame 24 that is coupled to the rear end portion 21B of the cushion frame 20 via the rotation axle 28 rotates.

As shown in FIG. 6, the seatback 14 of the vehicle seat 10 is reclined by the seatback 14 rerating toward the vehicle rear with respect to the seat cushion 12. If a vehicle occupant is seated while the seatback 14 is reclining, because the lower end portion 14A of the seatback 14 is disposed at the rear side of the rear end portion 12A of the seat cushion 12, a back surface position P1 of the vehicle occupant is smoothly curved along a surface 12B of the seat cushion 12 and a surface 14B of the seatback 14. Therefore, the posture of the vehicle occupant during reclining of the vehicle seat 10 is maintained (that is, slumping of the posture of the vehicle occupant is suppressed), and a sensation of pressure on the vehicle occupant is suppressed.

In the vehicle seat 10 described above, the motor 30 and gearbox 32 are disposed at the front end portions 21A of the cushion frame 20. Therefore, even though the rotation center of reclining of the vehicle seat 10, which is the position of the rotation axle 28, is lowered in the seat up-down direction, a space S1 for the legs of a rear seat occupant underneath the rear side of the vehicle seat 10 may be assured, as shown in FIG. 2A. Furthermore, as illustrated in FIG. 2A, the under-buttock region 12C of the vehicle seat 10 is a structure that does not come into contact with the motor 30 and gearbox 32 when a vehicle occupant is seated on the seat cushion 12. Therefore, the vehicle seat 10 may suppress sensations of objects below the buttocks when a vehicle occupant is seated.

In the vehicle seat 10, the cushion frame 20 is provided with the pair of side frames 20A and 20B that oppose one another, one side frame 20A is disposed at one side of the seat cushion frame 20 in the seat width direction and the other side frame 20B is disposed at the other side of the seat cushion frame 20 in the seat width direction. The motor 30 is mounted to the face of the seat width direction inner side of the one side frame 20A. Therefore, the seat cushion 12 of the vehicle seat 10 may be made narrower (smaller) in width (see FIG. 1 and FIG. 4) than in a structure in which a motor is mounted to the face of the seat width direction outer side of the side frame 20A.

The vehicle seat 10 is equipped with the lifting and lowering apparatus 50 that moves the cushion frame 20 upward and downward with respect to the bases 46 provided at the floor surface, and with the lifter motor 70 that drives the lifting and lowering apparatus 50. The lifter motor 70 is mounted to the face of the seat width direction inner side of the other side frame 20B. Therefore, the seat cushion 12 of the vehicle seat 10 may be made narrower (smaller) in width by an amount corresponding to a width of the lifter motor 70 (see FIG. 1 and FIG. 4). Thus, in the vehicle seat 10, protrusion of a side portion of the seat cushion 12 to the vehicle width direction outer side may be suppressed compared to a structure in which a lifter motor is mounted at the seat width direction outer side of the side frame 20B.

In the vehicle seat 10, the lifter motor 70 and gearbox 72 are disposed at the front end portion 21A of the side frame 20B. The second driving force transmission unit 76 is provided at the vehicle seat 10. The second driving force transmission unit 76 couples the lifter motor 70 and gearbox 72 with the sector gear 68, which is disposed at the rear end portion 21B of the side frame 20B, and transmits the driving force of the lifter motor 70.

More specifically, the second driving force transmission unit 76 is provided with the pinion gear 80 at the rear portion of the side frame 20B, the gear 82 that rotates integrally with the pinion gear 80 and meshes with the sector gear 68, and the belt 84 that is wound round the output gear 78 of the gearbox 72 and the pinion gear 80. When the lifter motor 70 rotates, the output gear 78 of the gearbox 72 rotates, and the belt 84 moves in a circumferential direction thereof. When the belt 84 moves, the pinion gear 80 is rotated and the gear 82 rotates integrally with the pinion gear 80. When the gear 82 rotates, the sector gear 68 rotates in the up-down direction, and the lifter link 64 rotates together with the sector gear 68. Thus, the lifting and lowering apparatus 50 is operated and the cushion frame 20 moves upward and downward with respect to the bases 46.

In the vehicle seat 10 described above, as shown in FIG. 3A, the space S1 for the legs of a rear seat occupant underneath the rear side of the vehicle seat 10 may be assured more than in a structure in which a motor is provided at the seat width direction outer side of the other side frame 20B.

Figure 7:
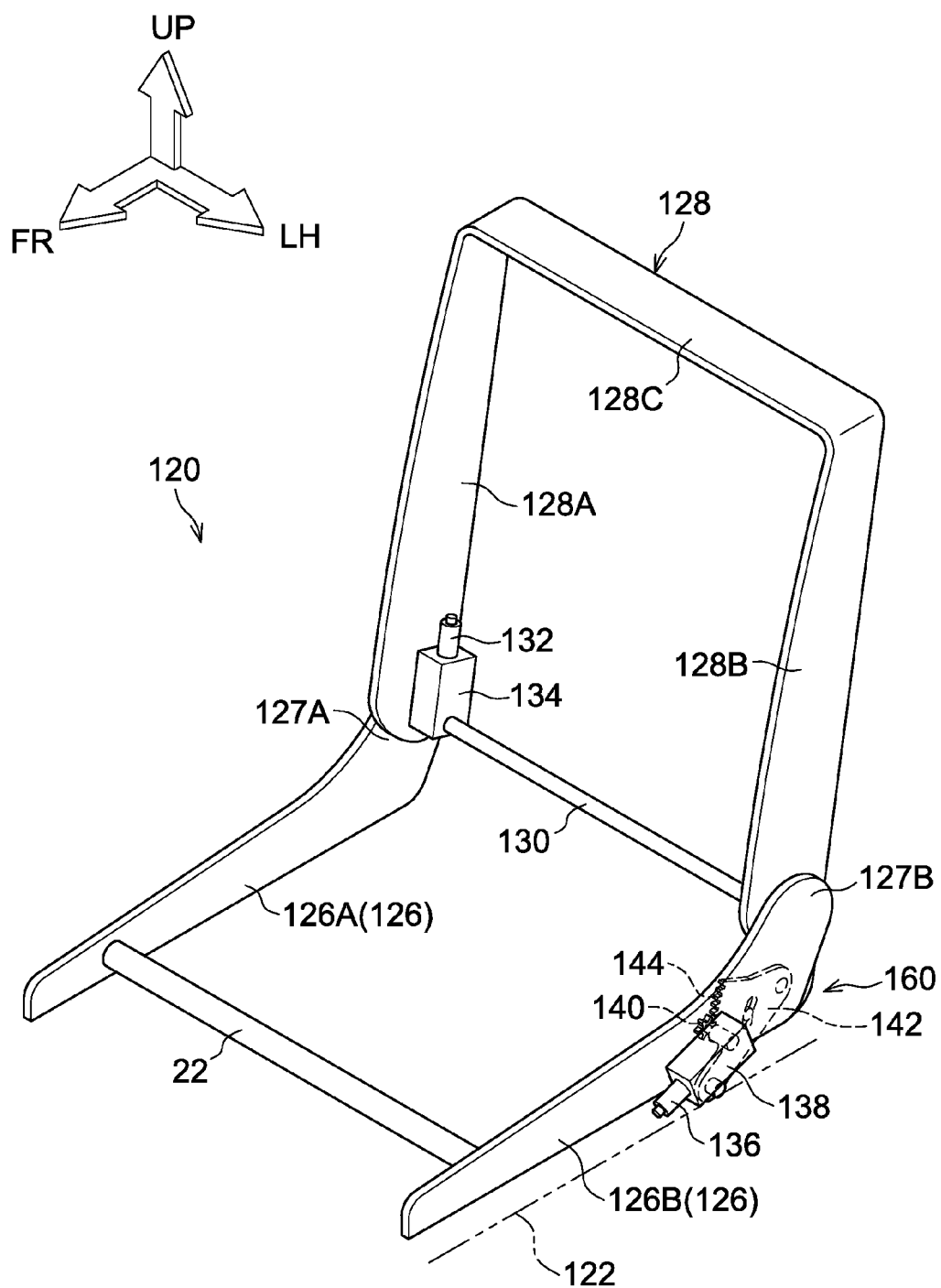
FIG. 7 is a perspective view showing structures in the vicinity of a seat cushion frame and seatback frame that are used in a vehicle seat according to a comparative example.
Figure 8:
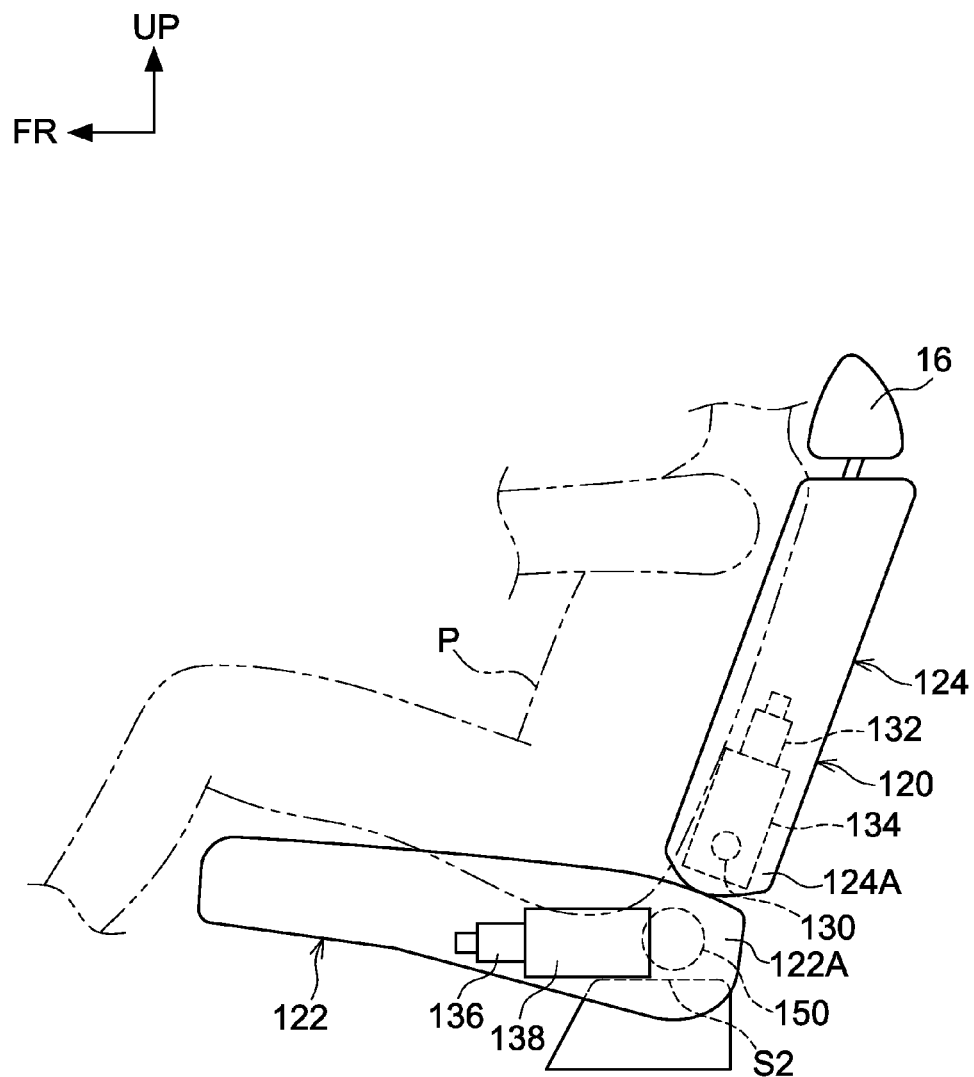
FIG. 8 is a side view showing the vehicle seat according to the comparative example.

Now, a vehicle seat 120 according to a comparative example is described using FIG. 7 to FIG. 9.

As shown in FIG. 8, in the vehicle seat 120 according to the comparative example, a lower end portion 124A of a seatback 124 is disposed at the upper side of a rear end portion 122A of a seat cushion 122.

As shown in FIG. 7, in the vehicle seat 120, a cushion frame 126 is provided with a pair of left and right side frames 126A and 126B that are disposed at both sides of the cushion frame 126 in the seat width direction. Rear end portions 127A and 127B of the side frames 126A and 126B protrude toward the vehicle upper side. A back frame 128 is provided with a pair of left and right side frames 128A and 128B, which are disposed at both sides of the back frame 128 in the seat width direction, and an upper frame 128C, which joins between upper end portions of the side frames 128A and 128B. Lower end portions of the pair of left and right side frames 128A and 128B are disposed at seat width direction inner sides of upper portions of the rear end portions 127A and 127B. A rear rod 150 that is arranged along the seat width direction (see FIG. 8) is provided at lower portions of the rear end portions 127A and 127B. The rear rod 150 is not shown in the drawing of FIG. 7.

A rotation axle 130 spans between lower end portions of the side frames 128A and 128B of the back frame 128 along the seat width direction. A motor 132 and a gearbox 134 for reclining are mounted (see FIG. 8) to a face of the seat width direction inner side of the side frame 128A (the side frame that is at the vehicle width direction right side looking from the vehicle rear side). Although not shown in the drawings, an output gear of the gearbox 134 meshes with a gear provided at the rotation axle 130 and transmits driving force of the motor 132 to the rotation axle 130.

As shown in FIG. 7, a lifter motor 136 and a gearbox 138 are mounted at the rear end portion 127B of the cushion frame 126 (the side frame that is at the vehicle width direction left side looking from the vehicle rear side). The lifter motor 136 and gearbox 138 are mounted to a face of the seat width direction outer side at the rear end portion 127B of the side frame 126B. The lifter motor 136 is a structure that drives a lifting and lowering apparatus 160 that is configured to move the cushion frame 126 upward and downward. An output gear 140 of the gearbox 138 meshes with a sector gear 144 of a lifter link 142.

As shown in FIG. 8, in the vehicle seat 120, a space S2 for the legs of a rear seat occupant is provided at the lower side of the rear rod 150 at the rear side of the seat cushion 122.

In this vehicle seat 120 according to the comparative example, a position of the rotation axle 130 in the seat up-down direction is higher than a position in the seat up-down direction of the rotation axle 28 of the vehicle seat 10 according to the first exemplary embodiment (see FIG. 1 and the like). As shown in FIG. 9, when an angle of the seatback 124 with respect to the seat cushion 122 is large (when the seatback 124 has been rotated toward the vehicle rear), a hollowed portion 125 in a substantial "V" shape is formed at a connecting portion between a surface 122B of the seat cushion 122 and a surface 124B of the seatback 124. Consequently, when a vehicle occupant P (see FIG. 8) is seated on the vehicle seat 120, the posture of the vehicle occupant P may slump and the vehicle occupant P may experience a sensation of pressure at their lower back. Furthermore, as shown in FIG. 7, the lifter motor 136 and gearbox 138 are mounted to the face of the seat width direction outer side of the side frame 126B of the vehicle seat 120. Therefore, a side face of the seat cushion 122 protrudes to the vehicle width direction outer side and the width of the seat cushion 122 is increased.

In recent years, in order to improve the comfort of vehicle seats during reclining, there have been demands for the position (height) of a rotation center of reclining to be lowered. In the vehicle seat 120, if the position (height) of the rotation axle 130 that is the rotation center of reclining is lowered, positions of the motor 132 and gearbox 134 have to be moved from the position behind the back to the position below the buttocks of the vehicle occupant P.

Although not shown in the drawings, if the vehicle seat is modified to a structure in which, for example, the motor 132 and gearbox 134 are disposed at the seat width direction inner side of the rear end portion of the side frame 126A of the cushion frame 126, space available for the legs of a rear seat occupant is reduced. Further, when a vehicle occupant P is seated on the vehicle seat, because of the motor 132 and gearbox 134, the vehicle occupant P may experience a sensation of objects below the buttocks.

By contrast, in the vehicle seat 10 according to the first exemplary embodiment as shown in FIG. 6, during reclining of the seatback 14, hollowing of the connecting region between the surface 12B of the seat cushion 12 and the surface 14B of the seatback 14 is slighter than in the vehicle seat 120. Consequently, when a vehicle occupant is seated on the vehicle seat 10, the back surface position P1 curves smoothly along the surface 12B of the seat cushion 12 and the surface 14B of the seatback 14. Therefore, slumping of the posture of the vehicle occupant during reclining is suppressed and a sensation of pressure for the vehicle occupant is suppressed.

In the vehicle seat 10, the width of the seat cushion 12 may be made narrower than in a structure in which, as in the vehicle seat 120, the lifter motor 136 and the like are mounted to the face of the seat width direction outer side of the rear portion of the side frame 126B.

—Supplementary Descriptions—

In the vehicle seat 10 according to the exemplary embodiment, the motor 30 and gearbox 32 are mounted to the cushion frame 20 at the face of the seat width direction inner side of the front end portion 21A of the one side frame 20A of the cushion frame 20, but the present invention is not limited to this structure. For example, a structure is possible in which a reclining motor and gearbox are mounted to the face of the seat width direction outer side of the front end portion 21A of the one side frame 20A of the cushion frame 20.

Configurations of the vehicle seat in which the motor 30 and gearbox 32 are mounted to the face of the seat width direction inner side of the front end portion 21A of the one side frame 20A directly and configurations in which the motor 30 and gearbox 32 are mounted to the face of the seat width direction inner side of the front end portion 21A indirectly, via a bracket or the like, are both encompassed by the present invention.

In the vehicle seat 10 according to the exemplary embodiment, the lifter motor 70 and gearbox 72 are mounted to the cushion frame 20 at the face of the seat width direction inner side of the front end portion 21A of the other side frame 20B of the cushion frame 20, but the present invention is not limited to this structure. For example, a structure is possible in which the lifter motor 70 and gearbox 72 are mounted to the face of the seat width direction inner side of the rear end portion 21B of the other side frame 20B of the cushion frame 20.

Configurations of the vehicle seat in which the lifter motor 70 and gearbox 72 are mounted to the face of the seat width direction inner side of the other side frame 20B of the cushion frame 20 directly and configurations in which the lifter motor 70 and gearbox 72 are mounted to the face of the seat width direction inner side of the other side frame 20B indirectly, via a bracket or the like, are both encompassed by the present invention.

In the vehicle seat 10 according to the exemplary embodiment, the first driving force transmission unit 36 that transmits driving force of the motor 30 to the rotation axle 28 is provided with the belt 42 and the like, but the present invention is not limited to this structure. Further, the second driving force transmission unit 76 of the vehicle seat 10 that transmits driving force of the lifter motor 70 to the sector gear 68 is provided with the belt 84 and the like, but the present invention is not limited to this structure. For example, instead of the belt 42 or 84, a flexible shaft that serves as a flexible rotation axle, a flexible torque cable that joins an output shaft with an input shaft, or the like may be employed. Further, if the output gear of a gearbox and a pinion gear are linearly arranged, a rack and pinion may be employed. Further yet, a chain and sprocket or the like may be employed instead of a belt and pinion gear.

In the vehicle seat 10 according to the exemplary embodiment, the lifting and lowering apparatus 50 that is configured to move the seat cushion 12 upward and downward is provided. However, the structure, shapes of structural components and the like of the lifting and lowering apparatus 50 may be modified.

A specific exemplary embodiment of the present invention has been described in detail, but the present invention is not to be limited to the present exemplary embodiment and it will be clear to the ordinary practitioner that numerous alternative embodiments are possible within the technical scope of the claims.

What is claimed is:

1. A vehicle seat comprising:
a seat cushion frame provided at a seat cushion, the seat cushion frame including a pair of side frames opposing one another in a seat width direction, a first side frame of the pair of side frames being disposed at a first side of the seat cushion frame in the seat width direction, and a second side frame of the pair of side frames being disposed at a second side of the seat cushion frame in the seat width direction;
a seatback frame structuring a seatback, the seatback frame being rotatably coupled to a rear end portion of the seat cushion frame via a rotation axle in a front-rear direction of the vehicle seat;
a drive unit disposed at a front side of the seat cushion frame in the front-rear direction and directly mounted to an inner face of the first side frame of the pair of side frames; and
a first driving force transmission unit coupling the drive unit with the rotation axle, the first driving force transmission unit being configured to transmit driving force of the drive unit to the rotation axle.

2. The vehicle seat according to claim 1, further comprising:
a lifting and lowering apparatus configured to move the seat cushion frame upward and downward with respect to a base provided at a floor surface; and
a lifter drive unit configured to drive the lifting and lowering apparatus and mounted to an inner face of the second side frame of the pair of side frames.

3. The vehicle seat according to claim 2, further comprising:
a second driving force transmission unit coupling an operating unit with the lifter drive unit, the second driving force transmission unit being configured to transmit driving force of the lifter drive unit to the operating unit, the operating unit being disposed at a rear end portion of the second side frame of the pair of side frames and configured to operate the lifting and lowering apparatus; wherein
the lifter drive unit is disposed at a front side of the second side frame in the front-rear direction.

4. The vehicle seat according to claim 1, wherein:
a lower end portion of the seatback is disposed at a rear side of a rear end portion of the seat cushion; and
at least a portion of the lower end portion of the seatback is disposed at a lower side with respect to a sitting face of the seat cushion.

* * * * *